US012771389B2

(12) United States Patent
Ahn et al.

(10) Patent No.: US 12,771,389 B2
(45) Date of Patent: Oct. 20, 2026

(54) WIRELESS COMMUNICATION DEVICE AND OPERATING METHOD FOR PERFORMING AN OPERATION OF COMPENSATING FOR A FIRST ARRIVAL PATH (FAP) TIME INDEX BY USING A REFERENCE SIGNAL

(71) Applicant: SAMSUNG ELECTRONICS CO., LTD., Suwon-si (KR)

(72) Inventors: Minki Ahn, Suwon-si (KR); Sungsoo Kim, Suwon-si (KR); Jung Woon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 319 days.

(21) Appl. No.: 18/397,760

(22) Filed: Dec. 27, 2023

(65) Prior Publication Data

US 2024/0214017 A1 Jun. 27, 2024

(30) Foreign Application Priority Data

Dec. 27, 2022 (KR) ........................ 10-2022-0186021

(51) Int. Cl.

*H04B 1/12* (2006.01)
*H04B 1/00* (2006.01)
*H04B 1/16* (2006.01)

(52) U.S. Cl.

CPC ............. *H04B 1/12* (2013.01); *H04B 1/0096* (2013.01); *H04B 1/1607* (2013.01)

(58) Field of Classification Search

CPC ........ H04B 17/364; H04B 1/525; H04B 7/06; H04B 1/0475; H04B 17/328;

(Continued)

(56) References Cited

U.S. PATENT DOCUMENTS 10,168,416 B1 * 1/2019 Tong ......................... G01S 5/14
10,736,096 B2 * 8/2020 Kim .................... H04L 27/2662

(Continued)

FOREIGN PATENT DOCUMENTS

KR 10-2021-0111915 A 9/2021
KR 10-2517669 B1 4/2023
WO WO-2022051144 A1 * 3/2022 ........... H04B 17/252

OTHER PUBLICATIONS

"IEE Standard for Low-Rate Wireless Networks" IEEE Computer Society, LAN/MAN Standards Committee, IEEE Std 802.15.4-2020, (800 total pages).

(Continued)

*Primary Examiner* — Golam Sorowar

(74) *Attorney, Agent, or Firm* — Sughrue Mion, PLLC

(57) ABSTRACT

A first wireless communication apparatus includes: a transceiver configured to: receive a radio frequency (RF) signal via a channel from a second wireless communication apparatus, and downconvert the RF signal to generate a received signal that has a lower frequency than a frequency of the RF signal; and a processing circuit configured to: compare the received signal with a reference signal to generate a compensation index based on a comparison result, and compensate an initial first arrival path (FAP) time index of the received signal based on the compensation index to generate a final FAP time index.

17 Claims, 17 Drawing Sheets

(58) Field of Classification Search

CPC .... H04B 17/104; H04B 17/14; H04B 7/0617; H04B 17/21; H04B 2001/0408; H04B 1/04; H04B 17/318; H04B 2001/0425; H04B 1/0458; H04B 1/7156; H04B 17/336; H04B 7/0413; H04B 7/0696; H04B 7/088; H04B 1/123; H04B 1/126; H04B 1/30; H04B 1/40; H04B 1/56; H04B 17/24; H04W 64/00; H04W 24/10; H04W 64/006; H04W 24/08; H04W 56/0045; H04W 56/0015; H04W 56/0055; H04W 72/0453; H04W 8/24; H04W 16/28; H04W 52/242; H04W 56/001; H04W 56/002; H04W 56/004; H04W 56/006; H04W 56/009; H04W 88/085; H04W 88/10; H04W 56/00; H04W 64/003; H04W 4/029; H04W 4/40; H04W 52/325; H04L 5/0048; H04L 5/0051; H04L 27/2675; H04L 5/0053; H04L 5/0023; H04L 27/2657; H04L 5/005; H04L 25/0212; H04L 25/0224; H04L 27/2613; H04L 27/2662; H04L 5/0007; H04L 25/0204; H04L 1/0003; H04L 27/2672; H04L 5/001; H04L 5/0091; H04L 5/14; H04L 1/0009; H04L 27/0014; H04L 27/2665; H04L 27/364; H04L 25/0216; H04L 27/2602

See application file for complete search history.

(56) References Cited

U.S. PATENT DOCUMENTS

| | | | | |
|---|---|---|---|---|
| 10,903,882 | B2 | 1/2021 | Jeon et al. | |
| 11,258,497 | B2 | 2/2022 | Jeon et al. | |
| 2007/0205867 | A1 | 9/2007 | Kennedy et al. | |
| 2008/0032708 | A1 * | 2/2008 | Guvenc | G01S 5/0273 455/456.2 |
| 2008/0218403 | A1 | 9/2008 | Lee et al. | |
| 2011/0286505 | A1 * | 11/2011 | Hedley | G01S 5/02213 375/224 |
| 2012/0069868 | A1 | 3/2012 | McLaughlin et al. | |
| 2014/0155082 | A1 * | 6/2014 | Krauss | G01S 5/0218 455/456.1 |
| 2017/0272119 | A1 | 9/2017 | Mclaughlin et al. | |
| 2018/0063811 | A1 | 3/2018 | Richley et al. | |
| 2020/0049791 | A1 * | 2/2020 | Xue | G01S 5/0273 |
| 2022/0070708 | A1 * | 3/2022 | Nam | G01S 5/0036 |

OTHER PUBLICATIONS

"IEE Standard for Low-Rate Wireless Networks Amendment 1: Enhanced Ultra Wideband (UWB) Physical Layers (PHYs) and Associated Ranging Techniques" IEEE Computer Society, LAN/MAN Standards Committee, IEEE Std 802.15.4z-2020, (174 total pages).

Guvenc et al., "Threshold-based TOA estimation for impulse radio UWB systems," 2005 IEEE International Conference on Ultra-Wideband, Mitsubishi Electric Research Laboratories, Inc., 2005, (10 total pages).

* cited by examiner

FIG. 8

TB

| Channel Environment | Reference Signal |
|---|---|
| CE1 | RS1 |
| CE2 | RS2 |
| CE3 | RS3 |

WIRELESS COMMUNICATION DEVICE AND OPERATING METHOD FOR PERFORMING AN OPERATION OF COMPENSATING FOR A FIRST ARRIVAL PATH (FAP) TIME INDEX BY USING A REFERENCE SIGNAL

CROSS-REFERENCE TO RELATED APPLICATION

This application is based on and claims priority under 35 U.S.C. § 119 to Korean Patent Application No. 10-2022-0186021, filed on Dec. 27, 2022 in the Korean Intellectual Property Office, the disclosure of which is incorporated by reference herein in its entirety.

BACKGROUND

The embodiments of the present relates to a wireless communication device, and more particularly, to a wireless communication device generating time of arrival (ToA) information by using a received data signal and transmitting the generated ToA information to a transmitter side, and an operating method of the wireless communication device.

Various electronic devices, such as smartphones, tablet personal computers (PCs), portable multimedia players (PMPs), laptop PCs, and/or wearable devices, are being distributed.

Technologies using electronic devices which support ultra-wideband (UWB) communication are being studied. For example, technology for measuring the locations of electronic devices by using the UWB communication between electronic devices and for providing various services by using the measured locations has been proposed. The UWB communication may use a larger bandwidth than other communication methods, and a location measurement using UWB communication may have less error than the location measurement using a global positioning system (GPS).

However, electronic devices performing UWB communication may be subject to various channel environments, and accordingly, the previously proposed ToA measurement method may not provide accurate measurement results in a multipath environment, and thus, a method to solve this issue is required.

SUMMARY

The embodiments of the present disclosure provide a wireless communication device performing an operation of compensating for a first arrival path (FAP) time index by using a reference signal for providing an accurate measurement result in a multipath environment, and an operating method of the wireless communication device.

According to one or more embodiments, a first wireless communication apparatus comprises a transceiver configured to: receive a radio frequency (RF) signal via a channel from a second wireless communication apparatus, and downconvert the RF signal to generate a received signal that has a lower frequency than a frequency of the RF signal: and a processing circuit configured to: compare the received signal with a reference signal to generate a compensation index based on a comparison result, and compensate an initial first arrival path (FAP) time index of the received signal based on the compensation index to generate a final FAP time index.

According to one or more embodiments, a first wireless communication apparatus comprises: a transceiver configured to: receive a plurality of radio frequency (RF) signals from a second wireless communication apparatus via a channel, and generate a plurality of received signals by converting each of the plurality of RF signals from a first frequency to a second frequency lower than the first frequency: and a processing circuit configured to: compare a power shape of each received signal of the plurality of received signals with a power shape of a reference signal to generate corresponding compensation indexes based on a respective comparison result, compensate an initial first arrival path (FAP) time index of each received signal of the plurality of received signals based on a respective compensation indexe to generate corresponding interim FAP time indexes, and generate final FAP time index based on the interim FAP time indexes.

According to one or more embodiments, an operating method of a first wireless communication apparatus, the operating method comprises: measuring an initial first arrival path (FAP) time index of a received signal from a second wireless communication apparatus: comparing the received signal with a reference signal: generating a compensation index based on a result of the comparing: and generating a final FAP time index by applying the compensation index to the initial FAP time index.

BRIEF DESCRIPTION OF THE DRAWINGS

Embodiments will be more clearly understood from the following detailed description taken in conjunction with the accompanying drawings in which:

FIG. 8 is a table of reference information according to one or more embodiments;

DETAILED DESCRIPTION OF THE EMBODIMENTS

Figure 1:
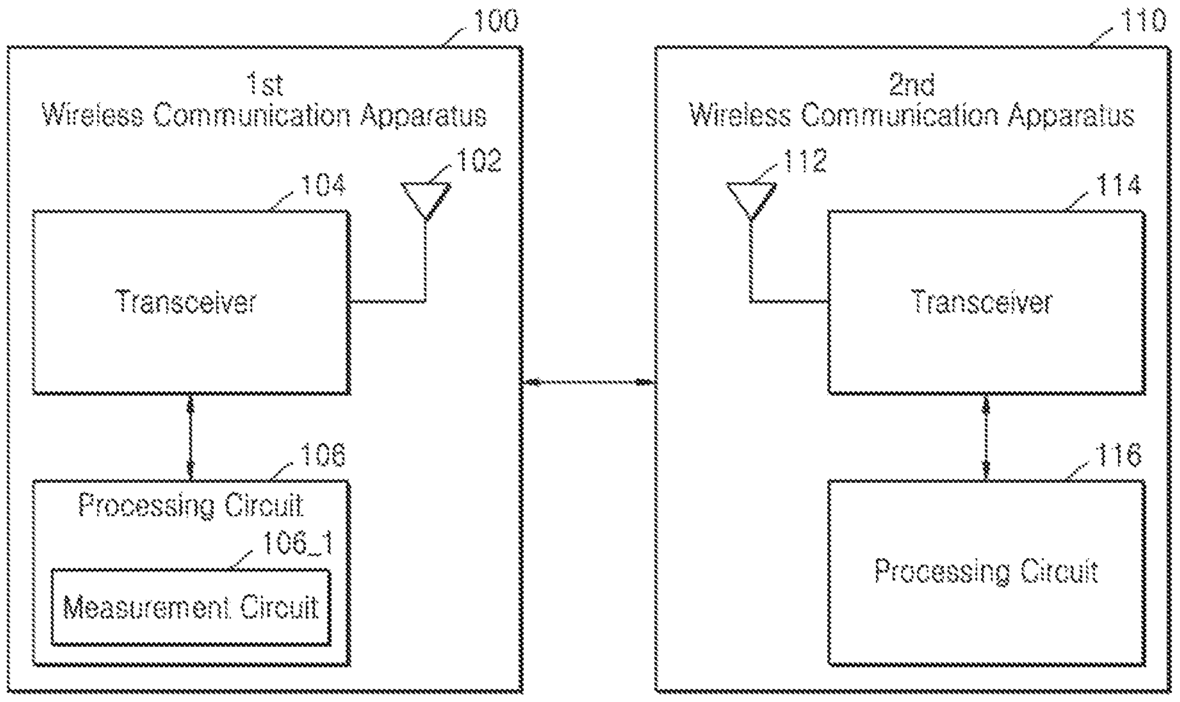
FIG. 1 is a block diagram of a wireless communication system according to one or more embodiments.
Figure 2A:
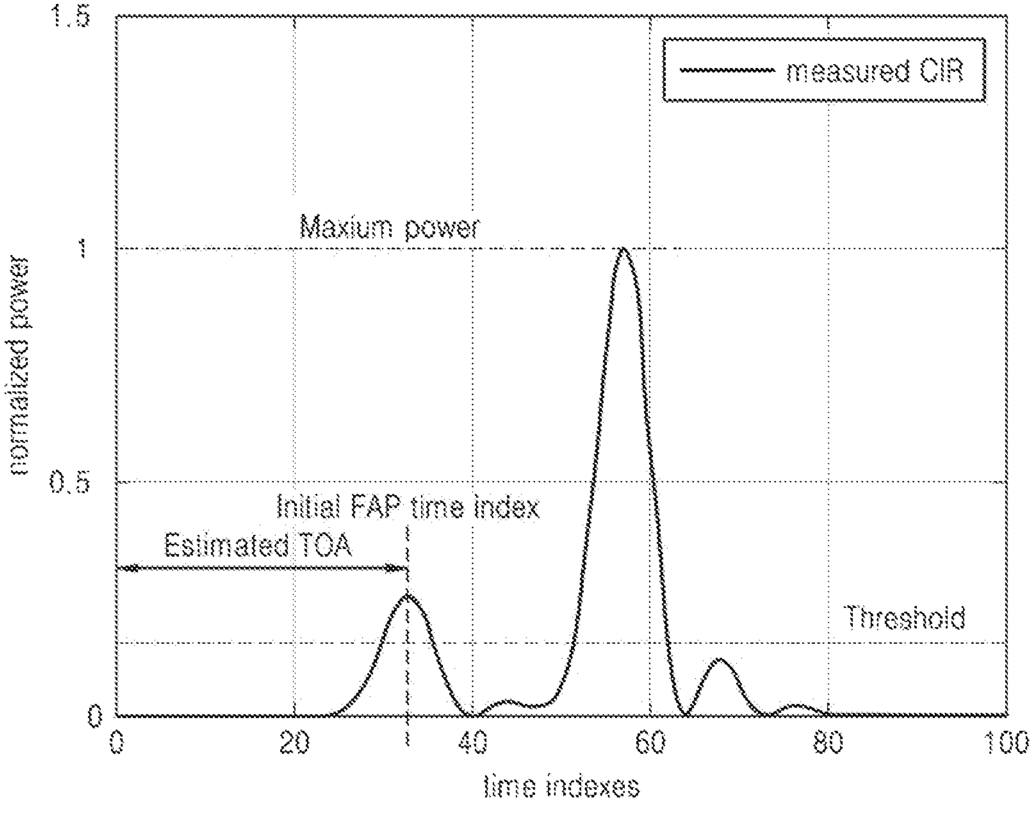
FIGS. 2A and 2B are diagrams for describing a simple threshold (ST)-based time of arrival (ToA) algorithm in time domain (TD) (ST-TD) method, to which one or more embodiments are applied.
Figure 2B:
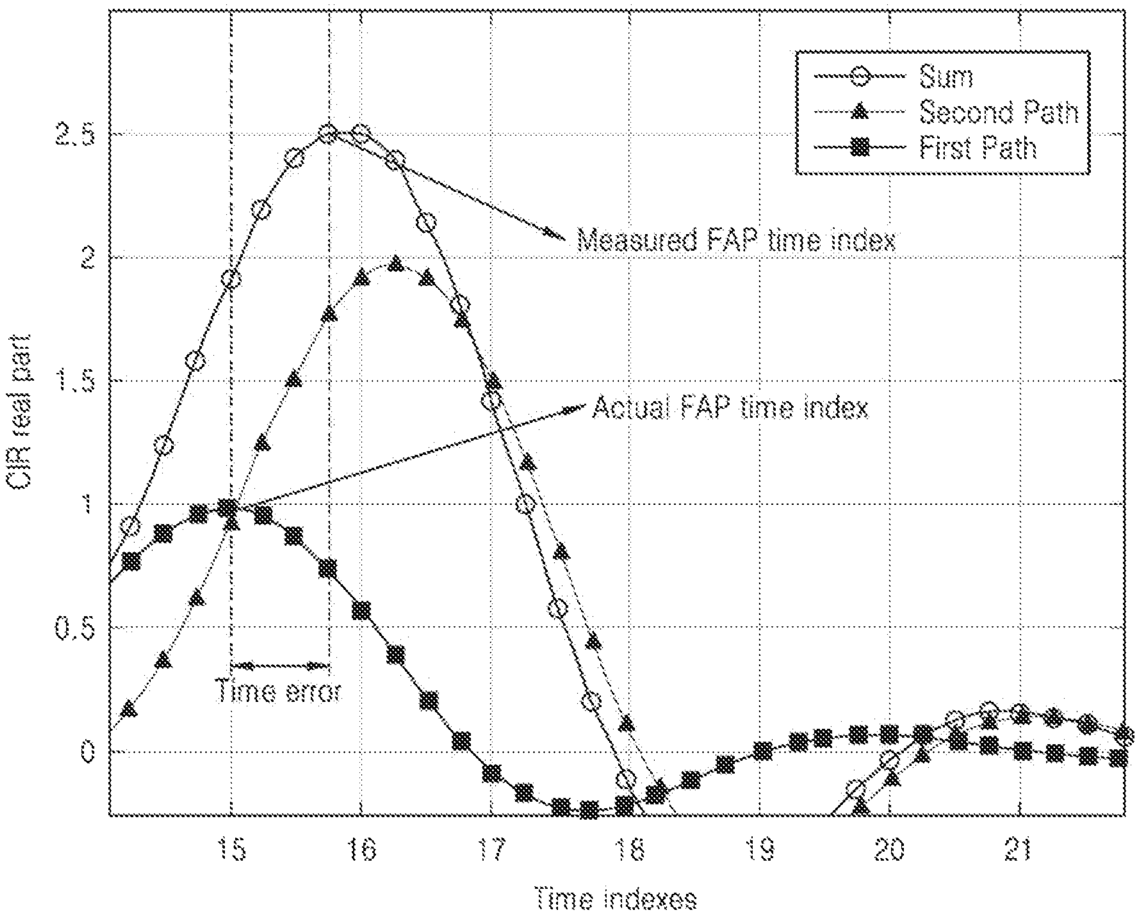

FIG. 1 is a block diagram of a wireless communication system 10 according to one or more embodiments, and FIGS. 2A and 2B are diagrams for describing a simple threshold (ST)-based time of arrival (ToA) algorithm in time domain (TD) (ST-TD) method, to which one or more embodiments are applied.

FIG. 1 illustrates an ultra-wideband communication system as one or more embodiments of the wireless communication system 10. Hereinafter, to describe embodiments of the present disclosure, a ultra-wideband (UWB) communication system using a frequency band of the UWB (e.g., a frequency band of between 3.1 GHZ and 10 GHZ) is used as a main target. However, the embodiments of the present disclosure may be applicable with some modifications to other communication systems having similar technical backgrounds and channel types (e.g., long term evolution (LTE), LTE-advanced (A) (LTE-A), new radio (NR), wireless broadband (WiBro), and a cellular system such as global system for mobile communication (GSM), and a near field communication system, such as Bluetooth and near field communication (NFC)), as determined by one of ordinary skill in the art.

In addition, various functions described below may be implemented or supported by one or more computer programs, each of which includes computer-readable program code and is executed on a computer-readable medium. The terms "application" and "program" may be referred to as one or more computer programs, software components, instruction sets, procedures, functions, objects, classes, instances, related data, or portions thereof suitable for implementation of suitable computer-readable program code. The term "computer-readable program code" may include all types of computer code including source code, object code, and executable code. The term "computer-readable medium" may include all types of media accessible by a computer, such as read-only memory (ROM), random-access memory (RAM), a hard disk drive, a compact disk (CD), a digital video disk (DVD), or some other type of memory. The term "non-transitory" computer-readable media excludes wired, wireless, optical, or other communication links that transmit transient electrical signals or other signals. The non-transitory computer-readable media may include media on which data is permanently stored, and media on which data is stored and later overwritten, such as a rewritable optical disk and an erasable memory device.

Referring to FIG. 1, the wireless communication system 10 may include a first wireless communication apparatus 100 and a second wireless communication apparatus 110. For example, any one of the first wireless communication apparatus 100 and the second wireless communication apparatus 110 may be implemented as an access point functioning as a router, a gateway, or any other type of access point known to one of ordinary skill in the art, or a station, such as a terminal, a mobile terminal, a wireless terminal, and a user device. In some embodiments, any one of the first wireless communication apparatus 100 and the second wireless communication apparatus 110 may also include a portable electronic device, such as a mobile phone, a laptop computer, and a wearable device, or a stationary electronic device, such as a desktop computer and a smart TV.

Hereinafter, in the embodiments to be described, the first wireless communication apparatus 100 is described as generating ToA information by using a radio frequency (RF) signal received from the second wireless communication apparatus 110. In this case, the first wireless communication apparatus 100 may correspond to a reception apparatus, and the second wireless communication apparatus 110 may correspond to a transmission apparatus. The second wireless communication apparatus 110 may measure time of flight (ToF) based on ToA information received from the first wireless communication apparatus 100.

The first wireless communication apparatus 100 may include an antenna 102, a transceiver 104, and a processing circuit 106. In some embodiments, the antenna 102, the transceiver 104, and the processing circuit 106 may be included in one package (e.g., same printed circuit board or same integrated circuit), or may also be respectively included in different packages. In addition, in some configurations, the processing circuit 106 may also be referred to as a controller, a processor, or a baseband processor. Hereinafter, duplicate descriptions of the first wireless communication apparatus 100 and the second wireless communication apparatus 110 are omitted.

The antenna 102 may receive an RF signal from the second wireless communication apparatus 110. In some embodiments, the antenna 102 may also include a phased array for beamforming. The transceiver 104 may frequency downconvert the RF signal received via the antenna 102 to generate a received signal, and provide the received signal to the processing circuit 106. The process of frequency downconverting the RF signal may include changing a frequency of the RF signal to a lower frequency. In one or more embodiments, the received signal may be referred to as a packet. In some embodiments, the transceiver 104 may include analog circuits, such as a low noise amplifier, a mixer, a filter, and a power amplifier.

The processing circuit 106 may include a measurement circuit 106_1. In one or more examples, targets to be measured by the measurement circuit 106_1 may be referred to as estimated targets. For example, an operation in which the measurement circuit 106_1 measures an arbitrary target may also be understood as an operation in which the measurement circuit 106_1 estimates an arbitrary target. The embodiments of the present disclosure describe the processing circuit 106 with measurement circuit 106_1. However, as understood by one of ordinary skill in the art, is the embodiments are not limited to these configurations, and the operation of the measurement circuit 106_1 may be understood as the operation of the processing circuit 106.

The measurement circuit 106_1 may measure an initial first arrival path (FAP) time index of the received signal.

Referring further to FIG. 2A, the measurement circuit 106_1 may measure the channel impulse response (CIR) values at the time indexes of the received signal and determine, as the initial FAP time index, the time index corresponding to a peak value, which exceeds the threshold for the first time, of the measured CIR values. The received signal may include a pre-set sequence, and the corresponding sequence may have also been determined by the measurement circuit 106_1. For example, the corresponding sequence may include a start-of-frame delimiter (SFD). The measurement circuit 106_1 may measure the CIR values corresponding to the time indexes of the time domain by using a correlation operation, or any other suitable operation known to one of ordinary skill in the art, between the received signal and the sequence. The measurement circuit 106_1 may determine a threshold based on the largest value of the measured CIR values. In one or more examples, the measurement circuit 106_1 may be configured (e.g., pre-loaded) with a predetermined threshold value. In one or more examples, in FIG. 2A, absolute values of the measured CIRs may be expressed as the normalized power on the vertical axis, and may be arranged as the time indexes on the horizontal axis. For example, for the time indexes, one space on the scale may correspond to 0.25 ns or any other suitable time interval.

When the channel between the first wireless communication apparatus 100 and the second wireless communication apparatus 110 includes a multipath (e.g., in a multipath environment), the first FAP time index measured in the measurement circuit 106_1 may include a time error. This time error may be introduced by multiple copies of the same signal having different characteristics.

Referring further to FIG. 2B, when the channel includes a first path and a second path, and the received signal has passed through the first path and the second path, a first CIR shape of the received signal having passed through the first path may be different from a second CIR shape of the received signal having passed through the second path. Although the time index corresponding to the CIR having the largest value in the first CIR shape may correspond to the actual FAP time index, because the CIR shape of the received signal measured in the measurement circuit 106_1 is a sum of the first CIR shape and the second CIR shape, there may be the time error (or time difference) between the measured FAP time index and the actual FAP time index. In one or more examples, the measured CIR real parts in FIG. 2B may be arranged as the time indexes on the horizontal axis. The actual FAP time index may be obtained by compensating for the measured FAP time index by the time error.

Referring back to FIG. 1, the measurement circuit 106_1 according to one or more embodiments may compare the received signal with a reference signal and generate a compensation index based on the comparison result, and may generate the final FAP time index by compensating for the initial FAP time index based on the compensation index. For example, to reduce the time error included in the initial FAP time index due to the multipath, the measurement circuit 106_1 may utilize the comparison result between the received signal and the reference signal. In one or more examples, an operation of comparing the received signal with the reference signal may include an operation of comparing powers of the received signal measured in the measurement circuit 106_1 with powers of the reference signal, or an operation of comparing a power shape of the received signal measured in the measurement circuit 106_1 with the power shape of the reference signal. For example, a signal to noise ratio (SNR) of the received signal may be compared with a SNR of the reference signal.

In one or more embodiments, the reference signal may include a signal received by the first wireless communication apparatus 100 via a reference channel including a single path between the first wireless communication apparatus 100 and the second wireless communication apparatus 110. The powers of the reference signal or the power shape of the reference signal may be measured in advance and stored as reference data in a memory of the first wireless communication apparatus 100, and the measurement circuit 106_1 may read the reference data from the memory. In some embodiments, the reference data may be periodically or aperiodically updated. In some embodiments, the memory may be implemented as a volatile memory, such as static RAM (SRAM) and dynamic RAM (DRAM). Furthermore, the memory may also be implemented as a non-volatile memory, such as a flash memory, magnetic RAM (MRAM), and resistive RAM (RRAM).

Hereinafter, one or more embodiments, in which the measurement circuit 106_1 generates the compensation index, is described in detail. The measurement circuit 106_1 may select target time indexes from a plurality of time indexes based on the initial FAP time index. In one or more examples, the target time indexes may be referred to as period in the time domain in which the received signal and the reference signal are compared with each other. For example, the measurement circuit 106_1 may select, as target time indexes, the preset number of time indexes adjacent to the initial FAP time index of the time indexes prior to the initial FAP time index. In one or more examples, the measurement circuit 106_1 may select, as target time indexes, the preset number of time indexes adjacent to the initial FAP time index of the time indexes behind the initial FAP time index. In one or more examples, the measurement circuit 106_1 may also select, as target time indexes, the preset number of time indexes adjacent to the initial FAP time index of the time indexes.

In one or more embodiments, the measurement circuit 106_1 may generate the compensation index based on differences between the powers of the received signal and the powers of the reference signal at the target time indexes. The measurement circuit 106_1 may calculate the difference between the power of the received signal and the power of the reference signal for each target time index, and accumulate (or sum) the differences corresponding to the target time indexes. The measurement circuit 106_1 may generate the compensation index by multiplying a scaling coefficient to the accumulation result. In one or more embodiments, the scaling coefficient may be preset as a weight for converting the power difference into the time offset. In some embodiments, the scaling coefficient may vary depending on the reference signal, the performance of the first wireless communication apparatus 100, or the channel environment.

In one or more embodiments, the generation of the compensation index by the measurement circuit 106_1 may be based on Formula 1 through Formula 3 below.

$$\delta_{FAP-Compen} = \text{ROUND}\left(\alpha \sum_{i=1}^{N} \left(\rho(\tau_p - i) - \rho_{ref}(\tau_p - i)\right)\right) \qquad \text{[Formula 1]}$$

$$\rho(x) = 10\log_{10}\frac{|y(x)|^2}{|y(\tau_p)|^2} \qquad \text{[Formula 2]}$$

$$\rho_{ref}(x) = 10\log_{10}\frac{|y_{ref}(x)|^2}{|y_{ref}(\tau_p)|^2} \qquad \text{[Formula 3]}$$

In Formula 1, $\tau_\rho$ may represent the initial FAP time index, a may represent the scaling coefficient, N may represent the number of preset target time indexes, and $\rho(\tau_\rho - i)$ and $\beta_{ref}(\tau_\rho - i))$ may respectively represent the power of the received signal and the power of the reference signal.

In Formula 2, y(x) may represent the received signal corresponding to the time index of a variable x, $y(\tau_\rho)$ may represent the received signal at the initial FAP time index $\tau_\rho$, and $\rho(x)$ may represent the power of the received signal corresponding to the time index of a variable x.

In Formula 3, $\gamma_{ref}$ (x) may represent the reference signal corresponding to the time index of a variable x, $\gamma_{ref}(\tau_\rho)$ may represent the reference signal at the initial FAP time index $\tau_p$, and $\rho_{ref}$ (x) may represent the power of the reference signal corresponding to the time index of a variable x.

Since Formula 1 through Formula 3 are only illustrative examples, the embodiments of the present disclosure are not limited to these configurations, and the measurement circuit 106_1 may efficiently generate the compensation index based on formulas any other suitable formulas known to one of ordinary skill in the art.

In one or more embodiments, the measurement circuit 106_1 may generate the final FAP time index by compensating the initial FAP time index based on the generated compensation index.

In one or more embodiments, the generation of the final FAP time index by the measurement circuit 106_1 may be based on Formula 4.

$$\delta_{FAP-Final} = \tau_p - \delta_{FAP-Compen} \quad \text{[Formula 4]}$$

In Formula 4, δFAP-Final may represent the final FAP time index, and the measurement circuit 106_1 may generate the final FAP time index $\delta_{FAP-Final}$ by subtracting the compensation index $\delta_{FAP-Final}$ from the initial FAP time index Tp.

In some embodiments, the measurement circuit 106_1 may conditionally generate the compensation index, and perform a compensation operation on the initial FAP time index. The measurement circuit 106_1 may determine whether the comparison result between the received signal and the reference signal exceeds the reference value, and if the reference value is exceeded, may estimate the magnitude of the time error at the initial FAP time index. In one or more examples, when the comparison result exceeds the reference value, the measurement circuit 106_1 may estimate that the initial FAP time index has a large time error (e.g., error leads to unacceptable degradation in performance), and compensate the initial FAP time index. In one or more examples, when the comparison result is equal to or less than the reference value, the measurement circuit 106_1 may estimate that the initial FAP time index has a small time error, and omit the compensation for the initial FAP time index. In one or more examples, when the comparison result exceeds the reference value, the measurement circuit 106_1 may generate the compensation index and compensate the initial FAP time index, and when the comparison result is equal to or less than the reference value, the measurement circuit 106_1 may determine the initial FAP time index as the final FAP time index.

In one or more embodiments, the processing circuit 106 may generate the ToA information based on the final FAP time index generated by the measurement circuit 106_1, and may transmit the ToA information to the second wireless communication apparatus 110 via the antenna 102 and the transceiver 104. The generation of the ToA information based on the final FAP time index generated by the measurement circuit 106_1 is more accurate than the conventional methods for generation the ToA information.

The embodiments described above may relate to a method, in which the first wireless communication apparatus 100 generates the final FAP time index, and the embodiments described below may relate to a method, in which the first wireless communication apparatus 100 accurately measures the final FAP time index to match the actual FAP time index. As understood by one of ordinary skill in the art, features of the embodiments for generating the final FAP time index may be combined with features of the embodiments for measuring the final FAP time index.

The antenna 102 may receive a plurality of RF signals from the second wireless communication apparatus 110. The plurality of RF signals may be transmitted in any order and/or at any interval from the second wireless communication apparatus 110, and the plurality of RF signals may include a preset sequence for generating the ToA information. The transceiver 104 may frequency downconvert the plurality of RF signals received via the antenna 102 down to generate a plurality of received signals, and provide the plurality of received signals to the processing circuit 106. The preset sequence may be used by a transceiver to recognize that information and/or measurements for measuring or generating the ToA information is included in a received signal.

The measurement circuit 106_1 may measure an initial FAP time index for a respective received signal. In one or more embodiments, the measurement circuit 106_1 may compare each of the power shapes of the received signals to the power shape of the reference signal, generate the compensation indexes based on the comparison results, and generate interim FAP time indexes based on the compensation indexes. In one or more examples, a power shape of a signal may be formed by the powers measured in the time domain. The measurement circuit 106_1 may generate the final FAP time index based on the interim FAP time indexes.

In one or more embodiments, the measurement circuit 106_1 may measure the CIR values of received signals at the interim FAP time indexes, accumulate CIR values for respective interim FAP time indexes, and generate CIR cumulative values respectively corresponding to interim FAP time indexes. The measurement circuit 106_1 may determine, as the final FAP time index, an interim FAP time index corresponding to the largest CIR cumulative value of the CIR cumulative values. Detailed descriptions of these features are given below with reference to FIGS. 10A through 10C.

In addition, in one or more embodiments, the measurement circuit 106_1 may calculate an average of the interim FAP time indexes, and determine the final FAP time index based on the average calculation results. Detailed descriptions of these features are described below with reference to FIG. 11.

In one or more examples, the second wireless communication apparatus 110 may include an antenna 112, a transceiver 114, and a processing circuit 116, and may receive the RF signals from the first wireless communication apparatus 100, and in this case, the embodiments described above of the first wireless communication apparatus 100 may also be applied to the second wireless communication apparatus 110.

The first wireless communication apparatus 100 according to one or more embodiments may accurately measure the ToA by appropriately compensating the FAP time index for the received signal considering the multipath environment, and as a result, the position of the first wireless communication apparatus 100 may be accurately identified and thus, an effective communication service may be provided to the first wireless communication apparatus 100.

Figure 3:
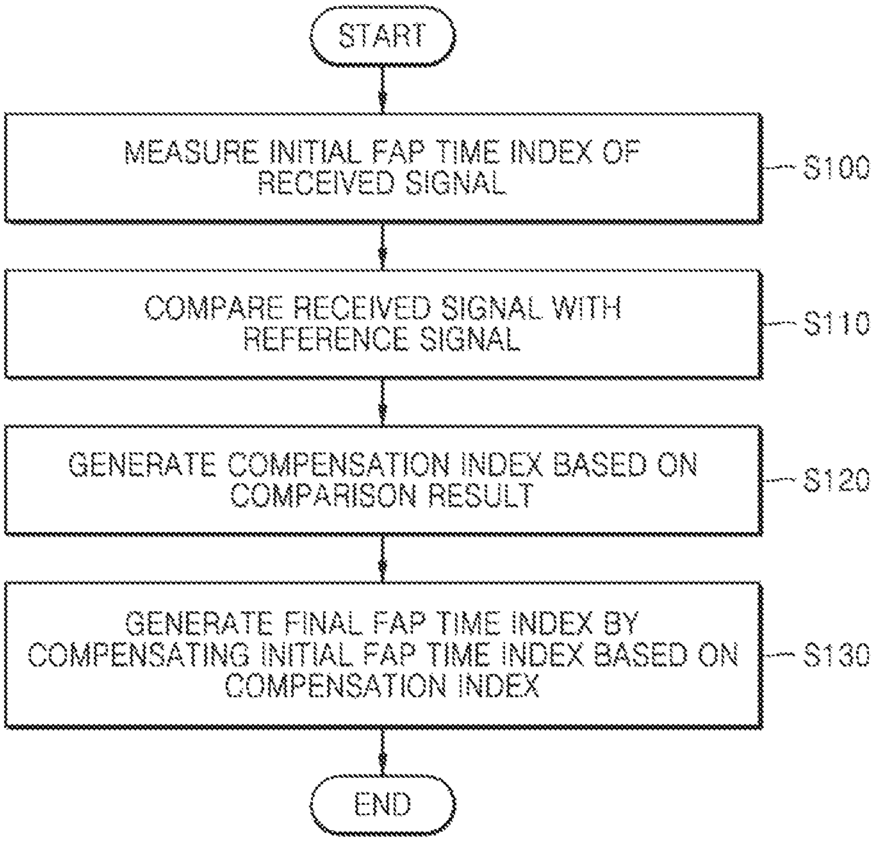
FIG. 3 is a flowchart of an operating method of a first wireless communication apparatus, according to one or more embodiments.

FIG. 3 is a flowchart of an operating method of the first wireless communication apparatus 100, according to one or more embodiments.

Referring to FIG. 3, in operation S100, the first wireless communication apparatus 100 may measure the initial FAP time index of the received signal.

In operation S110, the first wireless communication apparatus 100 may compare the received signal with the reference signal. In one or more embodiments, the reference signal may include a signal received by the first wireless communication apparatus 100 via a reference channel including a single path. In a mass production stage, the reference information about the reference signal may be stored in advance in the first wireless communication apparatus 100, or the reference information may be provided to the first wireless communication apparatus 100 via a certain signaling after the product shipment. In one or more embodiments, the first wireless communication apparatus 100 may compare the powers of the received signal with the powers of the reference signal at the target time indexes that are selected according to the initial FAP time index.

In operation S120, the first wireless communication apparatus 100 may generate the compensation index based on the comparison result. In one or more embodiments, when the sum of the powers of the received signal is greater than the sum of the powers of the reference signal, the first wireless communication apparatus 100 may generate the compensation index for advancing the initial FAP time index. In addition, when the sum of the powers of the received signal is less than the sum of the powers of the reference signal, the first wireless communication apparatus 100 may generate the compensation index for delaying the initial FAP time index.

In operation S130, the first wireless communication apparatus 100 may generate the final FAP time index by compensating the initial FAP time index based on the compensation index. In one or more embodiments, the first wireless communication apparatus 100 may generate the final FAP time index by subtracting the compensation index from the initial FAP time index. In some embodiments, the first wireless communication apparatus 100 may apply different weights to the initial FAP time index and the compensation index, and then generate the final FAP time index by performing subtraction between the application results. For example, the weight may be determined depending on the reference signal, the performance of the first wireless communication apparatus 100, or the channel environment.

Figure 4:
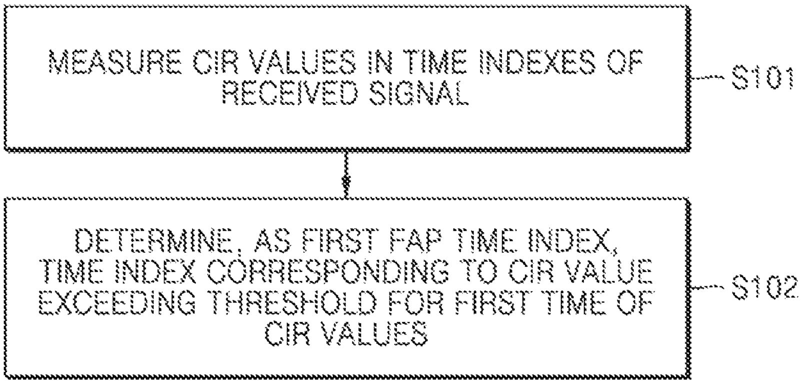
FIG. 4 is a flowchart of operation S100 in FIG. 3, according to one or more embodiments.

FIG. 4 is a flowchart of operation S100 in FIG. 3, according to one or more embodiments.

Referring to FIG. 4, in operation S101, the first wireless communication apparatus 100 may measure CIR values at the time indexes of the received signal.

In operation S102, the first wireless communication apparatus 100 may determine, as the initial FAP time index, the time index corresponding to a peak value exceeding the threshold for the first time of the CIR values measured in operation S101. In one or more embodiments, the threshold may be determined based on a CIR having the largest value of the CIR values measured in operation S101. The threshold may be generated by multiplying a preset coefficient to the largest CIR value.

Figure 5A:
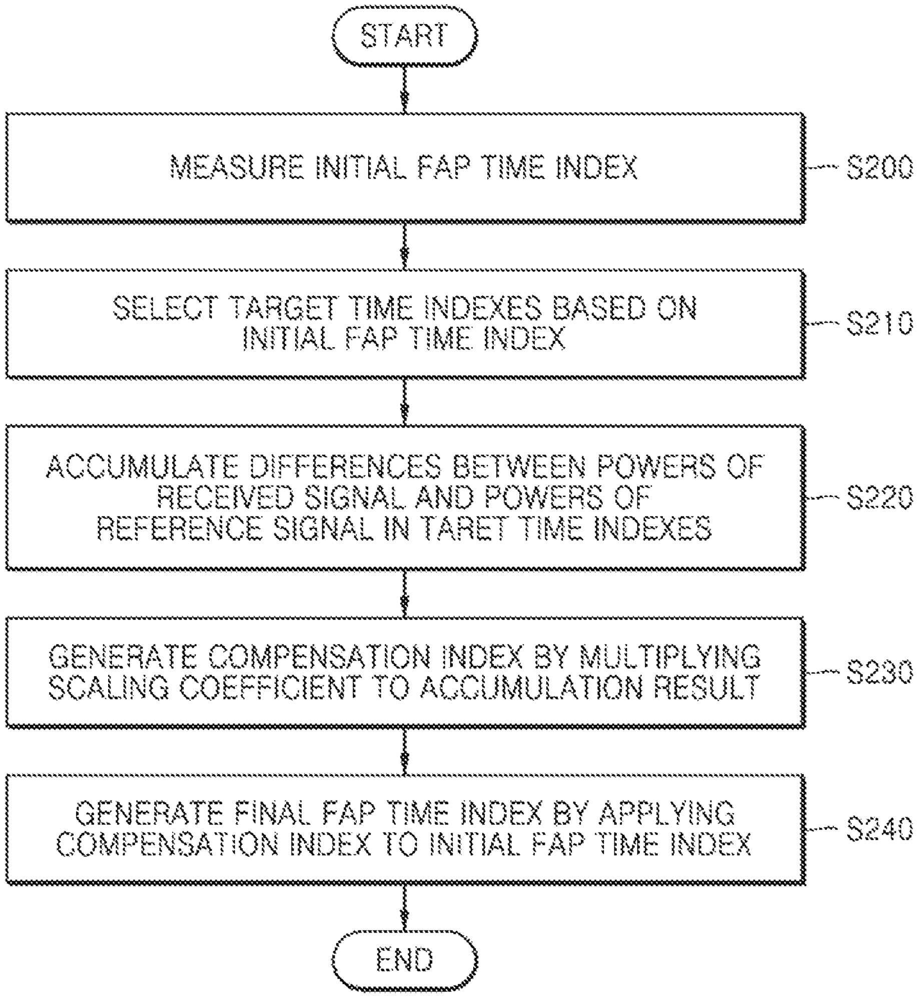
FIG. 5A is a flowchart of an operating method of a first wireless communication apparatus.
Figure 5B:
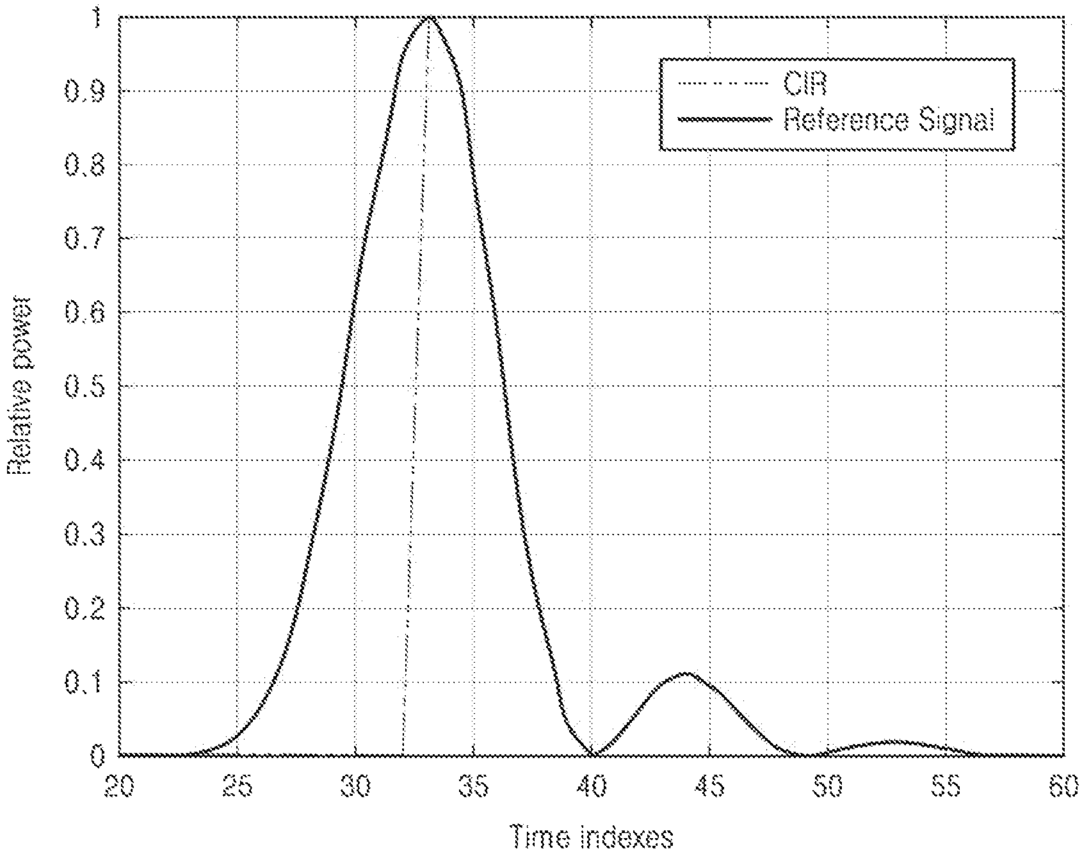
FIG. 5B is a diagram for describing a reference signal.
Figure 5C:
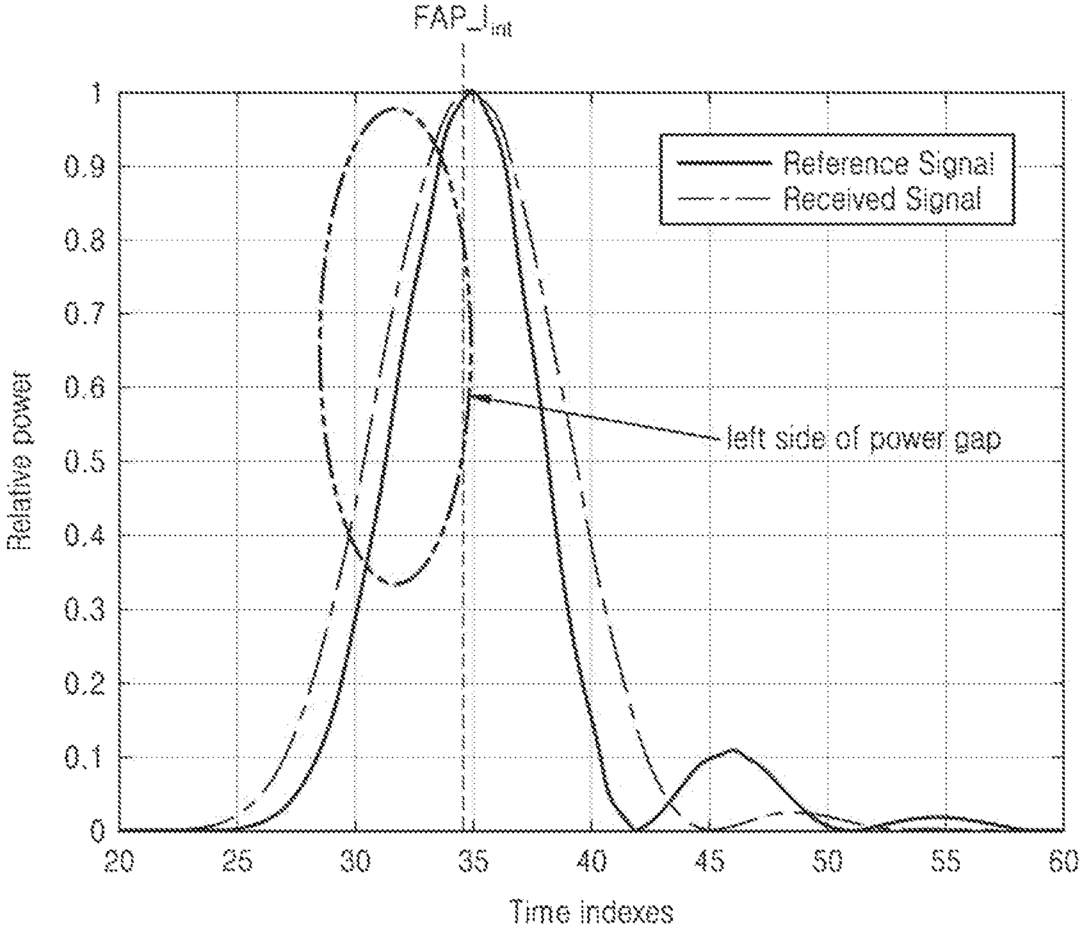
FIG. 5C is a diagram of a method of generating a compensation index, according to one or more embodiments.

FIG. 5A is a flowchart of an operating method of the first wireless communication apparatus 100, FIG. 5B is a diagram for describing the reference signal, and FIG. 5C is a diagram of a method of generating the compensation index.

Referring to FIG. 5A, in operation S200, the first wireless communication apparatus 100 may measure the initial FAP time index of a received signal according to one or more of the embodiments described above.

In operation S210, the first wireless communication apparatus 100 may select the target time indexes based on the initial FAP time index.

In operation S220, the first wireless communication apparatus 100 may accumulate a difference between the powers of the received signal (e.g., SNR) and the powers of the reference signal (e.g., SNR) at the target time indexes selected in operation S210.

In operation S230, the first wireless communication apparatus 100 may generate the compensation index by multiplying a scaling coefficient to the accumulation result in operation S220.

In operation S240, the first wireless communication apparatus 100 may generate the final FAP time index by applying the compensation index generated in operation S230 to the initial FAP time index.

Referring further to FIG. 5B, the reference signal may be received by the first wireless communication apparatus 100 via the reference channel including a single path, and the measured powers of the reference signal may correspond to an ideal CIR. As described above, the measured power of the reference signal (e.g., SNR) may be organized and stored as reference information in the first wireless communication apparatus 100, and the first wireless communication apparatus 100 may perform a comparison operation between the received signal and the reference signal based on the reference information.

Referring further to FIG. 5C, the first wireless communication apparatus 100 may perform a comparison operation based on a power difference between the received signal and the reference signal on a left side of a maximum peak of these signals with an initial FAP time index $FAP\_I_{int}$ as a reference. For example, the first wireless communication apparatus 100 may perform a comparison operation after arranging the maximum peak value of the power of the received signal and the maximum peak value of the power of the reference signal on the same time index. The target time indexes may be ahead of the initial FAP time index $FAP\_I_{int}$, and may include time indexes adjacent to the initial FAP time index $FAP\_I_{int}$. In one or more embodiments, the number of target time indexes may be preset. In some embodiments, the number of target time indexes may be variable on the reference signal, the performance of the first wireless communication apparatus 100, or the channel environment.

As illustrated in FIG. 5C, the first wireless communication apparatus 100 may identify that the received signal has passed two or more paths when the power of the received signal is greater than the power of the reference signal on the left side of the initial FAP time index $FAP\_I_{int}$ as a reference, and based on this identification result, the first wireless communication apparatus 100 may generate the final FAP time index with a reduced time error by compensating the initial FAP time index $FAP\_I_{int}$.

Figure 6:
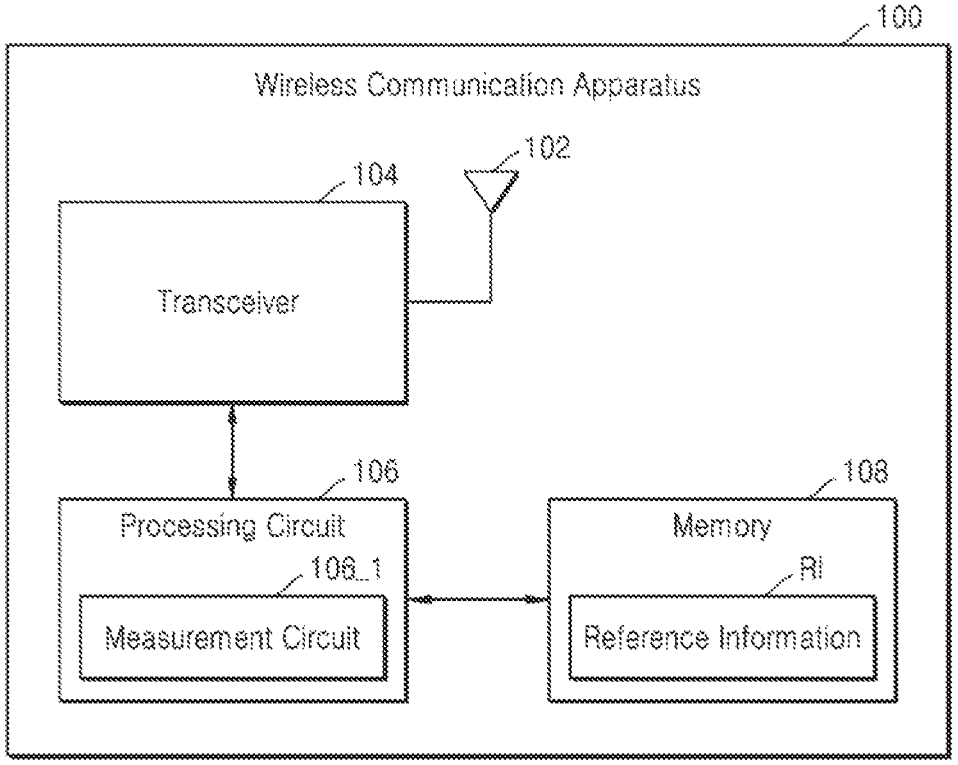
FIG. 6 is a block diagram of a first wireless communication apparatus according to one or more embodiments.

FIG. 6 is a block diagram of the first wireless communication apparatus 100 according to one or more embodiments. Hereinafter, duplicate descriptions given with reference to FIG. 1 are omitted.

Referring to FIG. 6, the first wireless communication apparatus 100 may include the antenna 102, the processing circuit 106, and a memory 108.

In one or more embodiments, the memory 108 may store reference information RI referred to when a comparison operation between the received signal and the reference signal is performed in the measurement circuit 106_1. For example, the reference information RI may include the powers at the time indexes or information indicating a power shape. In one or more embodiments, the measurement circuit 106_1 may access the memory 108, read the reference information RI, and perform a compensation operation on the initial FAP time index by using the reference information RI.

In some embodiments, the reference information RI may include information about a plurality of reference signals. In one or more examples, the reference information RI may include information about the reference signals mapped to various channel environments so that an optimum compensation index may be generated in various channel environments of the first wireless communication apparatus 100. In this case, the measurement circuit 106_1 may select any one of the plurality of reference signals based on the channel environment of the first wireless communication apparatus 100, and perform a compensation operation on the initial FAP time index by using the selected reference signal. The measurement circuit 106_1 may access the memory 108, read the reference information RI, obtain information corresponding to the reference signal selected from the reference information RI, and perform a compensation operation on the initial FAP time index. Details of these features are described below with reference to FIGS. 7 and 8.

Figure 7:
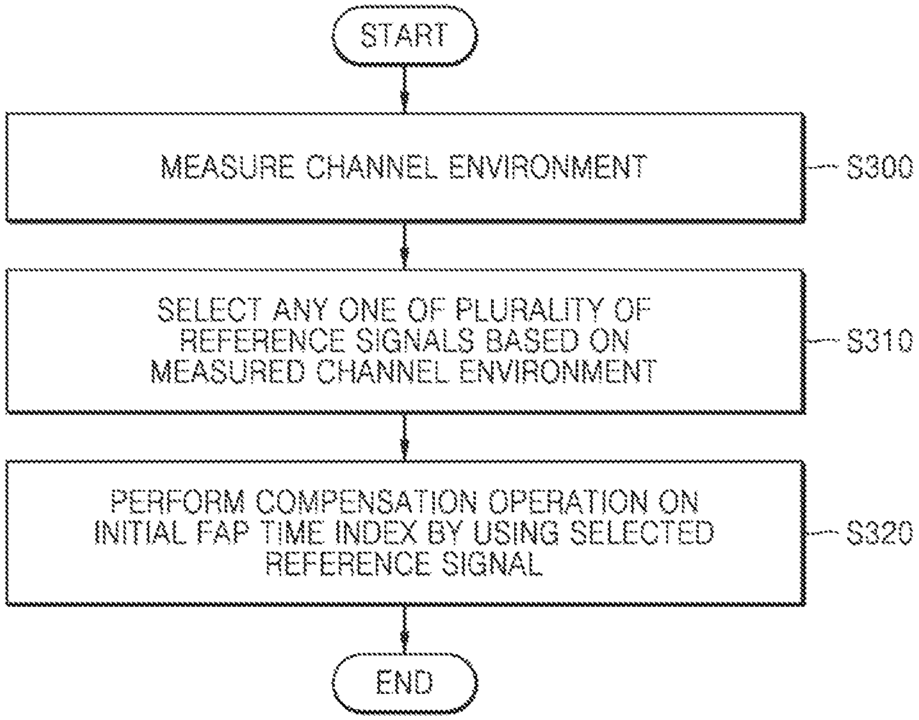
FIG. 7 is a flowchart of an operating method of a first wireless communication apparatus, according to one or more embodiments.

FIG. 7 is a flowchart of an operating method of the first wireless communication apparatus 100, according to an example embodiment.

Referring to FIG. 7, in operation S300, the first wireless communication apparatus 100 may measure a channel environment. In one or more embodiments, the first wireless communication apparatus 100 may measure the channel environment by using the estimation operation of the current channel.

In operation S310, the first wireless communication apparatus 100 may select any one of the plurality of reference signals based on the channel environment measured in operation S300, in accordance with the one or more embodiments described above.

In operation S320, the first wireless communication apparatus 100 may perform a compensation operation on the initial FAP time index by using the reference signal selected in operation S310.

FIG. 8 is a table TB of the reference information according to one or more embodiments. The reference information described in FIG. 8 may be stored in the memory 108 in FIG. 6.

Referring to FIG. 8, the table TB included in the reference information may include a channel environment field and a reference signal field, and the first through third channel environments CE1 through CE3 may be mapped to first through third reference signals RS1 through RS3, respectively.

In one or more embodiments, the first wireless communication apparatus 100 may select the first reference signal RS1 when the channel environment measured with reference to the table TB is the first channel environment CE1, select the second reference signal RS2 when the channel environment measured with reference to the table TB is the second channel environment CE2, and select the third reference signal RS3 when the channel environment measured with reference to the table TB is the third channel environment CE3.

However, as understood by one of ordinary skill in the art, the embodiment illustrated in FIG. 8 is merely an example, and is not limited thereto, and more or less reference signals may be mapped to more or less channel environments.

Figure 9:
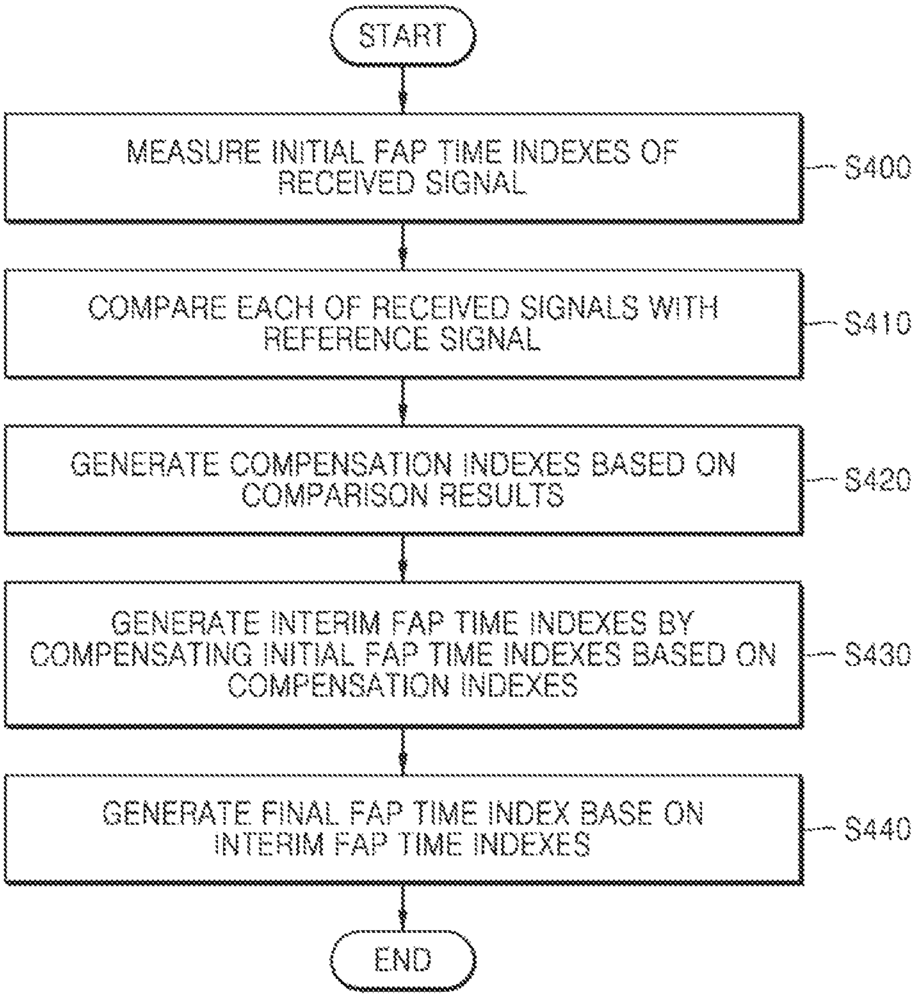
FIG. 9 is a flowchart of an operating method of a first wireless communication apparatus, according to one or more embodiments.

FIG. 9 is a flowchart of an operating method of the first wireless communication apparatus 100, according to one or more embodiments.

Referring to FIG. 9, in operation S400, the first wireless communication apparatus 100 may measure the initial FAP time indexes of the received signals.

In operation S410, the first wireless communication apparatus 100 may compare each of the received signals with the reference signal.

In operation S420, the first wireless communication apparatus 100 may generate the compensation indexes for the initial FAP time indexes measured in operation S400 based on the comparison results in operation S410.

In operation S430, the first wireless communication apparatus 100 may generate the interim FAP time indexes by compensating the initial FAP time indexes based on the compensation indexes generated in operation S420.

In operation S440, the first wireless communication apparatus 100 may generate the final FAP time index based on the interim FAP time indexes generated in operation S430.

Figure 10A:
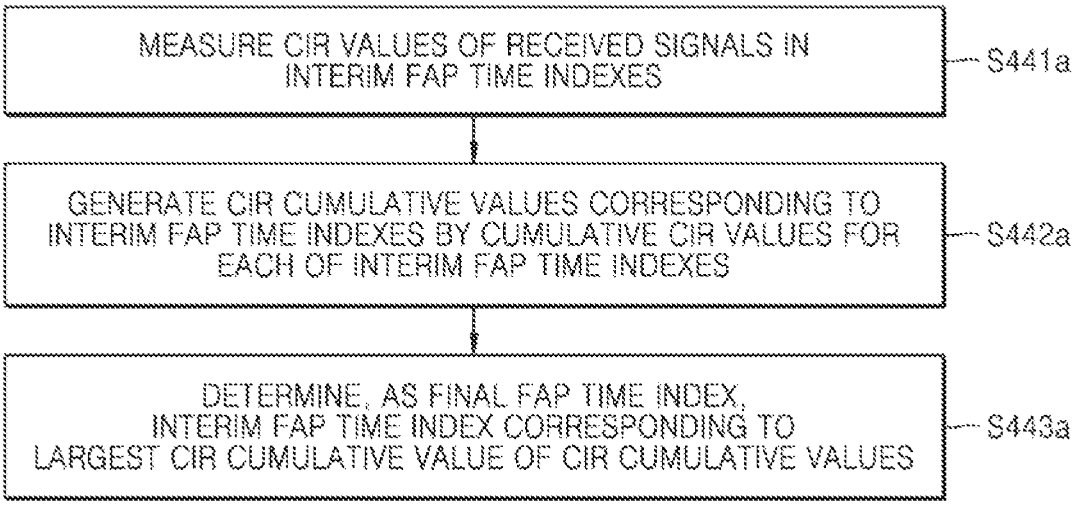
FIG. 10A is a flowchart of a detailed embodiment of operation S440 in FIG. 9.
Figure 10B:
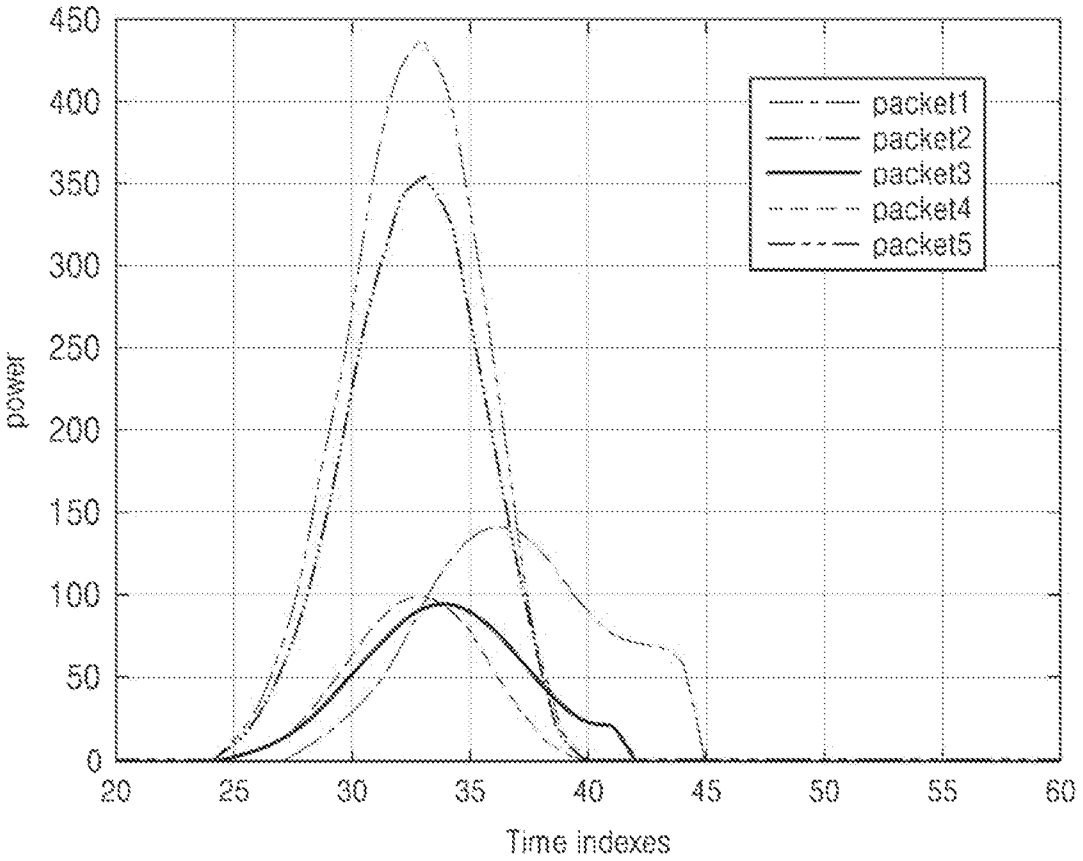
FIG. 10B is a diagram of received signals of operation S400 in FIG. 9.
Figure 10C:
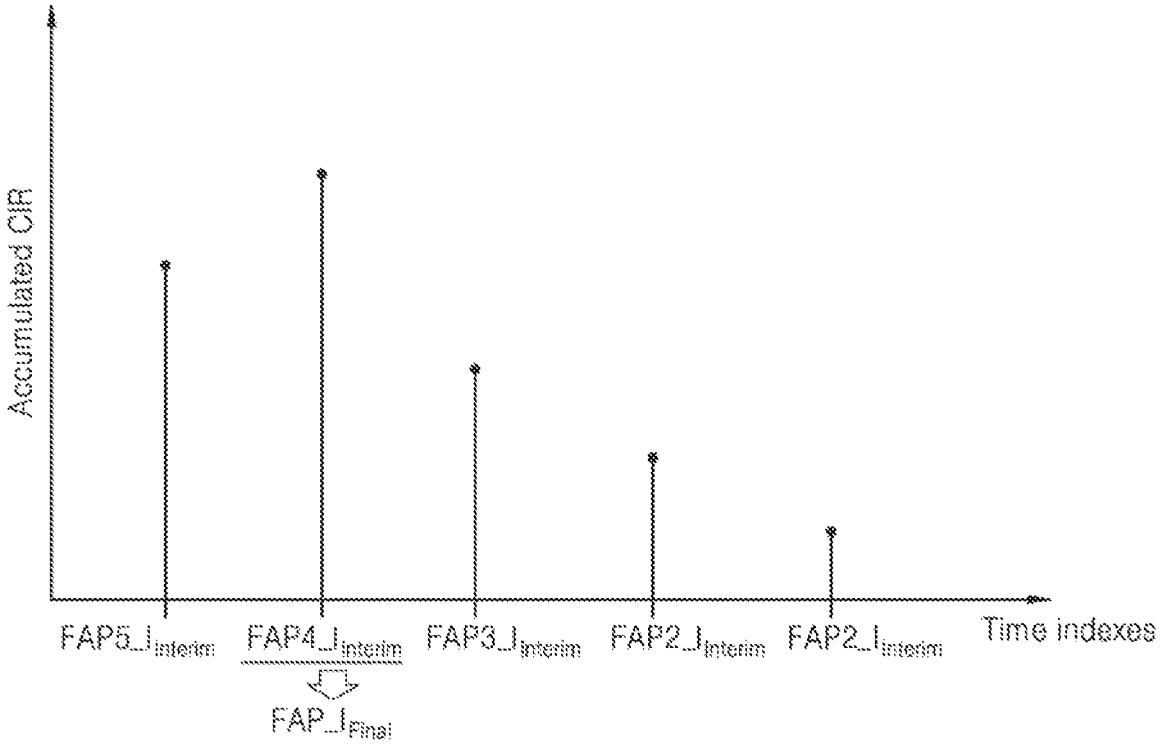
FIG. 10C is a detailed diagram for describing FIG. 10A, according to one or more embodiments.

FIG. 10A is a flowchart of operation S440 in FIG. 9 according to one or more embodiments, FIG. 10B is a diagram of the received signals of operation S400 in FIG. 9, and FIG. 10C is a detailed diagram for describing FIG. 10A.

Referring to FIG. 10A, in operation S441*a*, the first wireless communication apparatus 100 may measure the CIR values of the received signals at the interim FAP time indexes.

In operation S442*a*, the first wireless communication apparatus 100 may generate the CIR cumulative values corresponding to the interim FAP time indexes by accumulating the CIR values measured in operation S441*a* for each interim FAP time index.

In operation S443*a*, the first wireless communication apparatus 100 may determine, as the final FAP time index, the interim FAP time index corresponding to the largest CIR cumulative value of the CIR cumulative values generated in operation S442*a*.

Referring further to FIG. 10B, the received signals in operation S441*a* may include first through fifth packets, and the first through fifth packets may have different power shapes according to the time indexes. These characteristics may correspond to the channel environment changing for the first through fifth packets. For example, the channel may be a time-varying channel. The first wireless communication apparatus 100 according to one or more embodiments may use first through fifth packets to generate an accurate final FAP time index. In FIG. 10C, it may be assumed that the final FAP time index is generated by using the first through fifth packets in FIG. 10B.

Referring further to FIG. 10C, the first wireless communication apparatus 100 may generate first through fifth interim FAP time indexes $FAP1\_I_{Interim}$ through $FAP5\_I_{Interim}$ corresponding to the first through fifth packets, respectively. The first wireless communication apparatus 100 may generate the first through fifth interim FAP time indexes $FAP1\_I_{Interim}$ through $FAP5\_I_{Interim}$ by compensating the first through fifth initial FAP time indexes corresponding to the first through fifth packets, respectively.

The first wireless communication apparatus 100 may measure the CIRs of the first through fifth interim FAP time indexes $FAP1\_I_{Interim}$ through $FAP5\_I_{Interim}$ from the first through fifth packets, and may accumulate the CIRs for each of the first through fifth interim FAP time indexes $FAP1\_I_{Interim}$ through $FAP5\_I_{Interim}$. In one or more examples, the first wireless communication apparatus 100 may measure first CIRs corresponding to the first interim FAP time index $FAP1\_I_{Interim}$ from the first through fifth packets, and by accumulating measured first CIRs, may generate a first CIR cumulative value corresponding to the first interim FAP time index $FAP1\_I_{Interim}$. In one or more examples, the first wireless communication apparatus 100 may generate first through fifth CIR cumulative values corresponding to each of the first through fifth interim FAP time indexes $FAP1\_I_{Interim}$ through $FAP5\_I_{Interim}$.

In one or more embodiments, the first wireless communication apparatus 100 may find the largest value of the first through fifth CIR cumulative values, and determine the fourth interim FAP time index corresponding to the fourth CIR cumulative value, which is the largest value, as a final FAP time index $FAP\_I_{Final}$.

In some embodiments, the first wireless communication apparatus 100 may perform an average calculation instead of an accumulation operation, and generate first through fifth CIR average values corresponding to the first through fifth interim FAP time indexes $FAP1\_I_{Interim}$ through $FAP5\_I_{Interim}$.

Figure 11:
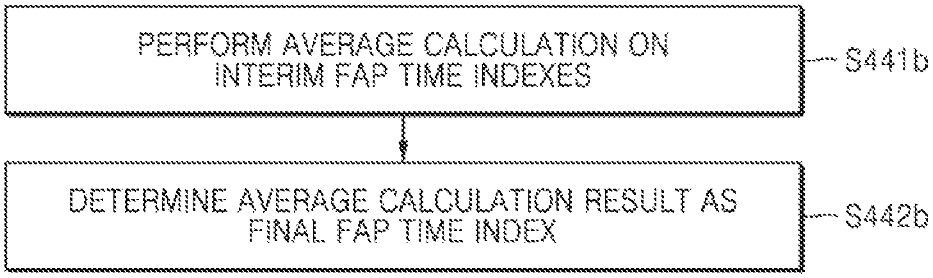
FIG. 11 is a flowchart of a detailed embodiment of operation S440 in FIG. 9, according to one or more embodiments.

FIG. 11 is a flowchart of a detailed embodiment of operation S440 in FIG. 9 according to one or more embodiments.

Referring to FIG. 11, in operation S441*b*, the first wireless communication apparatus 100 may perform the average calculation on the interim FAP time indexes.

In operation S442*b*, the first wireless communication apparatus 100 may determine the final FAP time index based on the average calculation result in operation S441*b*.

Referring further to FIG. 10C, the first wireless communication apparatus 100 may perform the average calculation on the first through fifth interim FAP time indexes $FAP1\_I_{Interim}$ through $FAP5\_I_{Interim}$, and determine, as the final FAP time index, the time index closest to or conforming with the average calculation result.

Figure 12:
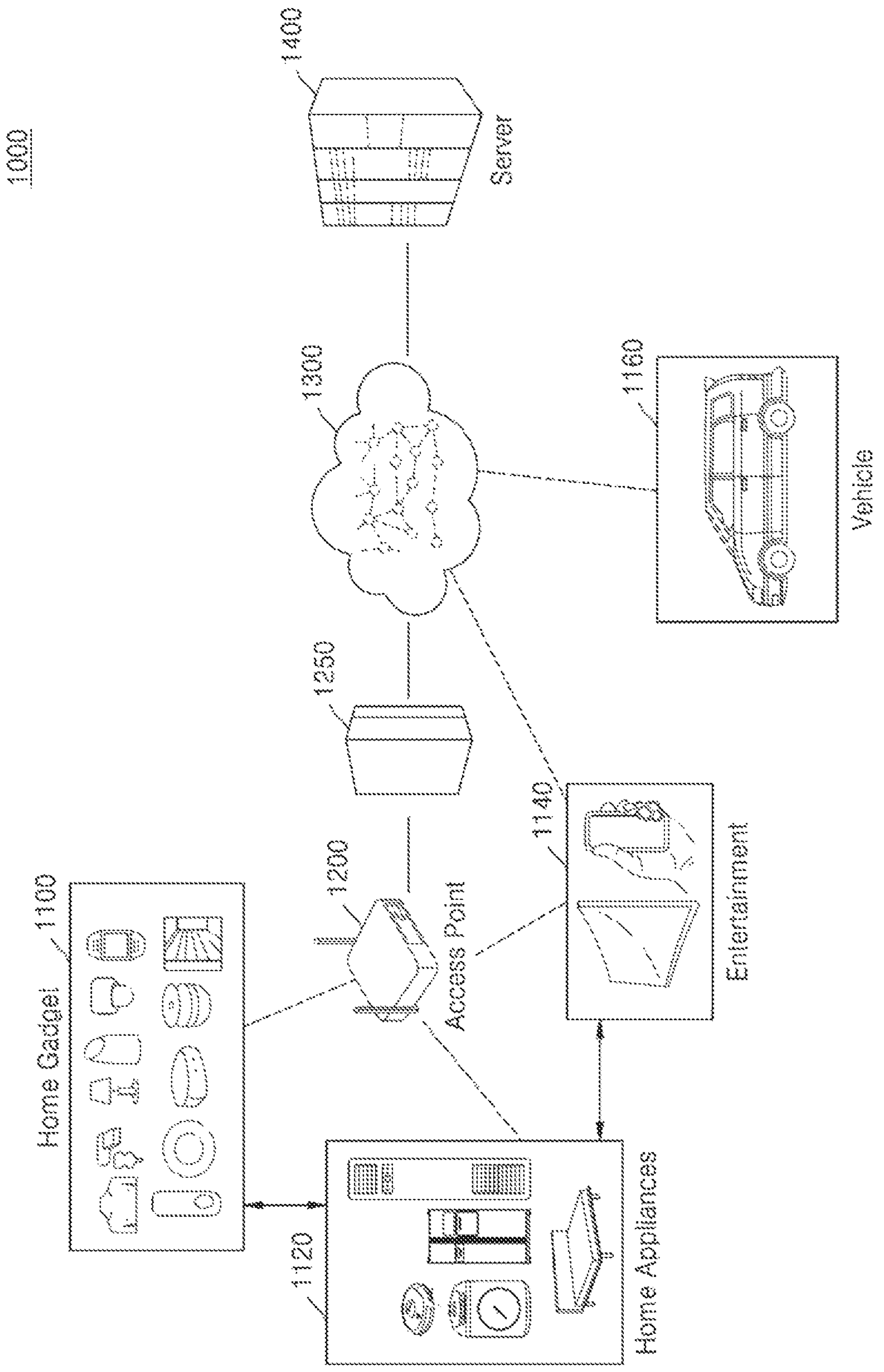
FIG. 12 is a conceptual diagram of an Internet of Things (IOT) network system, to which one or more embodiments are applied.

FIG. 12 is a conceptual diagram of an Internet of Things (IOT) network system 1000, to which embodiments are applied.

Referring to FIG. 12, the IoT network system 1000 may include a plurality of IoT devices 1100, 1120, 1140, and 1160, an access point 1200, a gateway 1250, a wireless network 1300, and a server 1400. The IoT may be referred to as a network of objects using wired/wireless communication.

Each of the plurality of IoT devices 1100, 1120, 1140, and 1160 may form a group according to characteristics thereof. For example, the plurality of IoT devices 1100, 1120, 1140, and 1160 may be grouped into a home gadget group 1100, a home appliance/furniture group 1120, an entertainment group 1140, or a vehicle group 1160, etc. The plurality of IoT devices 1100, 1120, and 1140 may be connected to a communication network or other IoT devices via the access point 1200. The access point 1200 may be embedded in one IoT device. The gateway 1250 may change a protocol so that the access point 1200 is connected to an external wireless network. The plurality of IoT devices 1100, 1120, and 1140 may be connected to the external communication network via the gateway 1250. The wireless network 1300 may include an internet and/or a public network. The plurality of IoT devices 1100, 1120, 1140, and 1160 may be connected to a server 1400 providing a certain service via the wireless network 1300, and a user may use the service by using at least one of the plurality of IoT devices 1100, 1120, 1140, and 1160.

According to one or more embodiments, the plurality of IoT devices 1100, 1120, 1140, and 1160 may compensate the initial FAP time index for the received signal by using the reference signal, and generate the final FAP time index. In one or more examples, the plurality of IoT devices 1100, 1120, and 1140 may perform a mutually efficient and effective localization operation, and provide a good service to a user.

While the embodiments have been particularly shown and described with reference to embodiments thereof, it will be understood that various changes in form and details may be made therein without departing from the spirit and scope of the following claims.

What is claimed is:

1. A first wireless communication apparatus comprising:
- a transceiver configured to:
  - receive a radio frequency (RF) signal via a channel from a second wireless communication apparatus, and
  - downconvert the RF signal to generate a received signal that has a lower frequency than a frequency of the RF signal; and
- a processing circuit configured to:
  - compare the received signal with a reference signal to generate a compensation index based on a comparison result, and
  - compensate an initial first arrival path (FAP) time index of the received signal based on the compensation index to generate a final FAP time index,
  - wherein the processing circuit is configured to generate the compensation index based on differences between powers of the received signal and powers of the reference signal at target time indexes selected based on the initial FAP time index, and
  - wherein the reference signal is received via a reference channel comprising a single path.

2. The first wireless communication apparatus of claim 1, wherein the processing circuit is configured to:
- measure channel impulse response (CIR) values at corresponding time indexes of the received signal, and
- determine, as the initial FAP time index, a time index from the time indexes having a peak value that exceeds a threshold of the CIR values for a first time.

3. The first wireless communication apparatus of claim 1, wherein the processing circuit is configured to select, as the target time indexes, a preset number of the time indexes that are adjacent to the initial FAP time index and ahead of the initial FAP time index.

4. The first wireless communication apparatus of claim 1, wherein the processing circuit is configured to:
- accumulate the differences to generate an accumulation result, and
- multiply a scaling coefficient by the accumulation result to generate the compensation index.

5. The first wireless communication apparatus of claim 1, wherein the processing circuit is configured to:
- based on a determination that a sum of powers of the received signal is greater than a sum of powers of the reference signal, generate the compensation index for advancing the initial FAP time index, and
- based on a determination the sum of the powers of the received signal is less than the sum of the powers of the reference signal, generate the compensation index for delaying the initial FAP time index.

6. The first wireless communication apparatus of claim 1, wherein the processing circuit is configured to select the reference signal from a plurality of reference signals based on an environment for the channel, and
- wherein each reference signal from the plurality of reference signals corresponds to a different type of environment.

7. The first wireless communication apparatus of claim 1, further comprising a memory configured to store reference information about the reference signal, wherein the processing circuit is configured to read the reference information from the memory, and compare the received signal with the reference information.

8. The first wireless communication apparatus of claim 7, wherein the reference information is updated periodically or aperiodically.

9. The first wireless communication apparatus of claim 1, wherein the processing circuit is configured to generate time of arrival (ToA) information based on the final FAP time index, and transmit the ToA information to the second wireless communication apparatus via the transceiver.

10. The first wireless communication apparatus of claim 1, wherein the first wireless communication apparatus is configured to communicate with the second wireless communication apparatus in an ultra-wideband system.

11. A first wireless communication apparatus comprising:

a transceiver configured to:

receive a plurality of radio frequency (RF) signals from a second wireless communication apparatus via a channel, and generate a plurality of received signals by converting each of the plurality of RF signals from a first frequency to a second frequency lower than the first frequency; and a processing circuit configured to:

compare a power shape of each received signal of the plurality of received signals with a power shape of a reference signal to generate corresponding compensation indexes based on a respective comparison result, compensate an initial first arrival path (FAP) time index of each received signal of the plurality of received signals based on a respective compensation index to generate corresponding interim FAP time indexes, and generate final FAP time index based on the interim FAP time indexes, wherein the reference signal is received via a reference channel comprising a single path.

12. The first wireless communication apparatus of claim 11, wherein the processing circuit is configured to:

measure a channel impulse response (CIR) value of each received signal of the plurality of received signals at a respective interim FAP time index, accumulates the CIR values for each interim FAP time index to generate CIR cumulative values corresponding to the interim FAP time indexes, and determine, as the final FAP time index, the interim FAP time index corresponding to a largest CIR cumulative value of the CIR cumulative values.

13. The first wireless communication apparatus of claim 11, wherein the processing circuit is configured to:

perform an average calculation on the interim FAP time indexes, and determine the final FAP time index based on a result of the average calculation.

14. The first wireless communication apparatus of claim 11, further comprising a memory configured to store reference information about a power shape of the reference signal, wherein the processing circuit is configured to access the reference information from the memory.

15. An operating method of a first wireless communication apparatus, the operating method comprising:

measuring an initial first arrival path (FAP) time index of a received signal from a second wireless communication apparatus;

comparing the received signal with a reference signal;

generating a compensation index based on a result of the comparing; and generating a final FAP time index by applying the compensation index to the initial FAP time index, wherein the comparing of the received signal with the reference signal comprises measuring differences between powers of the received signal and powers of the reference signal at a target time indexes selected based on the initial FAP time index, and wherein the reference signal is received via a reference channel comprising a single path.

16. The operating method of claim 15, wherein the generating the compensation index based on the result of the comparing further comprises generating the compensation index by multiplying a scaling coefficient to an accumulation result generated by accumulating the differences.

17. The operating method of claim 15, further comprising:

generating time of arrival (ToA) information based on the final FAP time index; and transmitting the ToA information to the second wireless communication apparatus.

* * * * *